(12) United States Patent
Lee

(10) Patent No.: US 11,937,357 B2
(45) Date of Patent: Mar. 19, 2024

(54) AEROSOL GENERATION DEVICE COMPRISING VOLTAGE CONVERTER AND METHOD FOR CONTROLLING SAME

(71) Applicant: KT&G CORPORATION, Daejeon (KR)

(72) Inventor: Seung Won Lee, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 736 days.

(21) Appl. No.: 16/982,629

(22) PCT Filed: Nov. 15, 2019

(86) PCT No.: PCT/KR2019/015632
§ 371 (c)(1),
(2) Date: Sep. 21, 2020

(87) PCT Pub. No.: WO2020/141718
PCT Pub. Date: Jul. 9, 2020

(65) Prior Publication Data
US 2021/0029786 A1   Jan. 28, 2021

(30) Foreign Application Priority Data
Jan. 3, 2019   (KR) .................. 10-2019-0000863

(51) Int. Cl.
*A24F 47/00*   (2020.01)
*A24F 40/40*   (2020.01)
(Continued)

(52) U.S. Cl.
CPC .............. *H05B 6/06* (2013.01); *A24F 40/40* (2020.01); *A24F 40/50* (2020.01); *H05B 1/02* (2013.01)

(58) Field of Classification Search
CPC ................................ A24F 40/50; A24F 40/57
See application file for complete search history.

(56) References Cited

U.S. PATENT DOCUMENTS 9,498,000 B2   11/2016   Kuczaj
9,717,277 B2   8/2017   Mironov
(Continued)

FOREIGN PATENT DOCUMENTS

CN   103889258 A      6/2014
CN   107095343 A  *   8/2017   .......... A24F 47/008
(Continued)

OTHER PUBLICATIONS

Communication dated Aug. 17, 2021 from the Japanese Patent Office in Japanese Application No. 2020-543993.
(Continued)

*Primary Examiner* — Eric Yaary
(74) *Attorney, Agent, or Firm* — Sughrue Mion, PLLC

(57) ABSTRACT

An aerosol generating device includes a battery, a heater for heating an aerosol generating material, a voltage converter, and a controller. An aerosol generating device is provided with a voltage converter that is arranged between a battery and a heater, and converts a voltage applied from the battery to a constant voltage to output a preset fixed voltage that is applied to the heater. A controller controls electric power supplied to the heater such that the preset fixed voltage is applied to the heater in a preheating mode.

7 Claims, 7 Drawing Sheets

(51) Int. Cl.
  *A24F 40/50*  (2020.01)
  *H05B 1/02*   (2006.01)
  *H05B 6/06*   (2006.01)

(56) References Cited

U.S. PATENT DOCUMENTS

| | | | |
|---|---|---|---|
| 9,913,950 B2 | 3/2018 | Goodman et al. |
| 9,949,507 B2 | 4/2018 | Flick |
| 10,070,667 B2 | 9/2018 | Lord et al. |
| 10,194,697 B2 | 2/2019 | Ferando et al. |
| 10,674,763 B2 | 6/2020 | Zinovik et al. |
| 11,583,008 B2 | 2/2023 | Hong et al. |
| 2016/0219938 A1 | 8/2016 | Mamoun et al. |
| 2017/0303595 A1 | 10/2017 | Bernauer et al. |
| 2019/0217028 A1 | 7/2019 | Nakano |
| 2019/0350266 A1 | 11/2019 | Phillips et al. |
| 2019/0380390 A1 | 12/2019 | Jeong et al. |
| 2020/0093177 A1 | 3/2020 | Han et al. |

FOREIGN PATENT DOCUMENTS

| | | |
|---|---|---|
| CN | 107095343 A | 8/2017 |
| EP | 0 973 419 B1 | 12/2004 |
| JP | 2015-524260 A | 8/2015 |
| KR | 10-2014-0002639 A | 1/2014 |
| KR | 10-2014-0056161 A | 5/2014 |
| KR | 20-2014-002575 U | 5/2014 |
| KR | 10-2016-0040643 A | 4/2016 |
| KR | 10-2017-0007235 A | 1/2017 |
| KR | 10-2017-0066337 A | 6/2017 |
| KR | 10-2018-0085648 A | 7/2018 |
| KR | 10-2018-0096602 A | 8/2018 |
| RU | 2014 131 454 A | 2/2016 |
| RU | 2015 148 609 A | 5/2017 |
| WO | 2013/098398 A2 | 7/2013 |
| WO | 2015/190810 A1 | 12/2015 |
| WO | 2016/058904 A1 | 4/2016 |
| WO | 2018/056300 A1 | 3/2018 |
| WO | 2018/110834 A2 | 6/2018 |
| WO | 2018/135887 A1 | 7/2018 |
| WO | 2018/202403 A1 | 11/2018 |

OTHER PUBLICATIONS

International search report for PCT/KR2019/015632 dated Feb. 25, 2020.
Written opinion for PCT/KR2019/015632 dated Feb. 25, 2020.
Korean Patent Office OA for 10-2019-0000863 dated Jul. 17, 2020.
Extended European Search Report dated Oct. 25, 2021 in European Application No. 19906986.5.
Communication dated Nov. 16, 2021 from the Russian Patent Office in Russian Application No. 2021113710.
Office Action dated Dec. 23, 2022 from the Chinese Patent Office in Application No. 201980012551.0.

* cited by examiner

FIG. 6

| OUTPUT VOLTAGE OF BATTERY | PREHEATING TIME WHEN VOLTAGE CONVERTER IS NOT LOCATED BETWEEN BATTERY AND HEATER | PREHEATING TIME WHEN VOLTAGE CONVERTER IS LOCATED BETWEEN BATTERY AND HEATER |
|---|---|---|
| 4.21V | 20.0SECONDS | 21.6SECONDS |
| 4.11V | 20.4SECONDS | 21.8SECONDS |
| 4.02V | 21.2SECONDS | 21.2SECONDS |
| 3.96V | 20.8SECONDS | 21.3SECONDS |
| 3.89V | 20.1SECONDS | 21.1SECONDS |
| 3.82V | 20.7SECONDS | 21.7SECONDS |
| 3.77V | 21.0SECONDS | 21.3SECONDS |
| 3.72V | 21.7SECONDS | 21.7SECONDS |
| 3.68V | 21.5SECONDS | 21.5SECONDS |
| 3.64V | 22.8SECONDS | 21.8SECONDS |
| 3.61V | 24.1SECONDS | 21.6SECONDS |

AEROSOL GENERATION DEVICE COMPRISING VOLTAGE CONVERTER AND METHOD FOR CONTROLLING SAME

CROSS-REFERENCE TO RELATED APPLICATIONS

This application is a National Stage of International Application No. PCT/KR2019/015632 filed on Nov. 15, 2019, which claims priority under U.S.C. § 119(a) to Korean Patent Application No. 10-2019-0000863 filed on Jan. 3, 2019.

TECHNICAL FIELD

One or more embodiments of the present disclosure provide an aerosol generating device including a voltage converter, and a method of controlling the same.

BACKGROUND ART

Recently, the demand for alternative methods to overcome the shortcomings of traditional cigarettes has increased. For example, there is growing demand for a method of generating aerosol by heating an aerosol generating material in cigarettes, rather than by combusting cigarettes. Accordingly, studies on a heating-type cigarette and a heating-type aerosol generating device have been actively conducted.

A heater within an aerosol generating device heats a cigarette inserted into the aerosol generating device. The aerosol generating device may control electric power supplied to the heater, based on a preset temperature profile.

The heater may operate in a preheating mode and a heating mode, based on the preset temperature profile. When the heater operates in the preheating mode, the aerosol generating device may consume a large amount of current for the heater to reach a preheating target temperature within a short period of time. Accordingly, an output voltage of a battery may suddenly drop rapidly. When the output voltage of the battery drops rapidly, it is difficult to monitor a temperature change of the heater in real time. Therefore, it may be difficult to regulate a preheating time to be constant for each cigarette being heated. As a result, the taste of a cigarette may not be consistent.

DESCRIPTION OF EMBODIMENTS

Technical Problem

One or more embodiments of the present disclosure provide an aerosol generating device including a voltage converter, and a method of controlling the same. One or more embodiments of the present disclosure provide a solution to a problem that the preheating time is not the same for each cigarette due to a rapid drop in the output voltage of a battery in the preheating mode.

Additional aspects will be set forth in part in the description which follows and, in part, will be apparent from the description, or may be learned by the practice of the presented embodiments.

Solution to Problem

According to an aspect of the present disclosure, an aerosol generating device includes: a battery; a heater configured to heat an aerosol generating material; a voltage converter configured to output a preset fixed voltage by converting a voltage applied from the battery to a constant voltage; and a controller configured to determine whether the heater is operating in a preheating mode, and control electric power supplied from the voltage converter to the heater such that the preset fixed voltage is applied to the heater in the preheating mode.

When the voltage applied from the battery is lower than the preset fixed voltage, the voltage converter may raise the applied voltage, and when the voltage applied from the battery is higher than the preset fixed voltage, the voltage converter may lower the applied voltage.

The heater may operate in the preheating mode and a heating mode, and the controller may control the electric power supplied to the heater such that a temperature of the heater reaches a preset preheating target temperature in the preheating mode, and control the electric power supplied to the heater such that the temperature of the heater is maintained below the preset preheating target temperature in the heating mode.

In addition, the controller may determine a period of time for preheating the heater in the preheating mode, based on an amount of power required for the temperature of the heater to reach the preset preheating target temperature and the preset fixed voltage applied to the heater, and the period of time may be relatively constant while the preset fixed voltage is applied to the heater.

The voltage converter may include any one of a buck boost converter, an operating amplifier (OP Amp), and a low dropout (LDO) voltage regulator.

The aerosol generating device may further include a first switch located between the voltage converter and the heater, and configured to switch between an open state and a closed state according to an input control signal; and a second switch located between the heater and ground, and configured to switch between an open state and a closed state according to an input control signal.

Moreover, the controller may output a control signal that closes the first switch during a heating period of the heater, and may also output the control signal that repeatedly opens and closes the second switch according to a power duty cycle of the heater during the heating period of the heater.

The first switch and the second switch may include a field-effect transistor.

Advantageous Effects of Disclosure

As a voltage converter output a preset fixed voltage by converting a voltage applied from a battery to a constant voltage, such that the preset fixed voltage may be applied to a heater. Therefore, since the preset fixed voltage may be constantly supplied to the heater, the same preheating time may be maintained for each cigarette being heated. In addition, since a degree to which an output voltage of the battery drops rapidly in a preheating mode may be reduced, power efficiency of the battery may be increased.

BRIEF DESCRIPTION OF DRAWINGS

FIG. 6 is a diagram illustrating an example of a preheating time when a voltage converter is located between a battery and a heater.

BEST MODE

According to an embodiment of the present disclosure, an aerosol generating device includes: a battery; a heater configured to heat an aerosol generating material; a voltage converter configured to output a preset fixed voltage by converting a voltage applied from the battery to a constant voltage; and a controller configured to determine whether the heater is operating in a preheating mode, and control electric power supplied from the voltage converter to the heater such that the preset fixed voltage is applied to the heater in the preheating mode.

Mode of Disclosure

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

Figure 1:
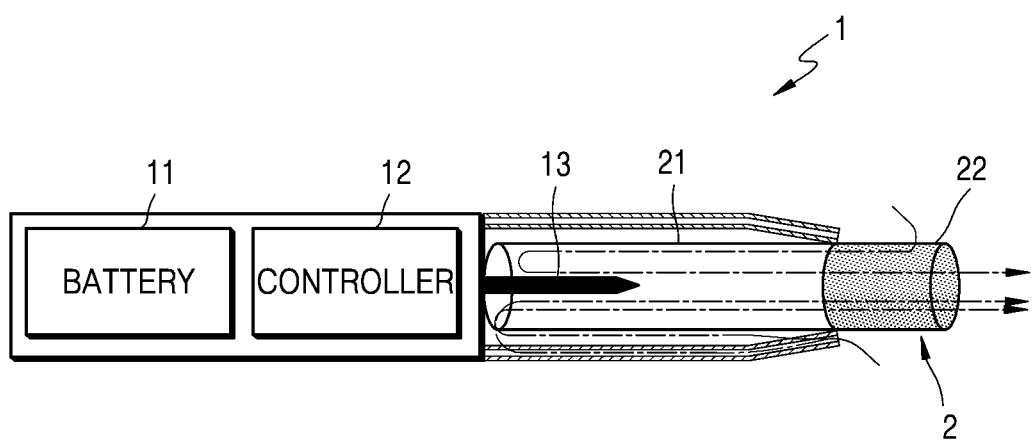
FIGS. 1 through 3 are diagrams showing examples in which a cigarette is inserted into an aerosol generating device.
Figure 2:
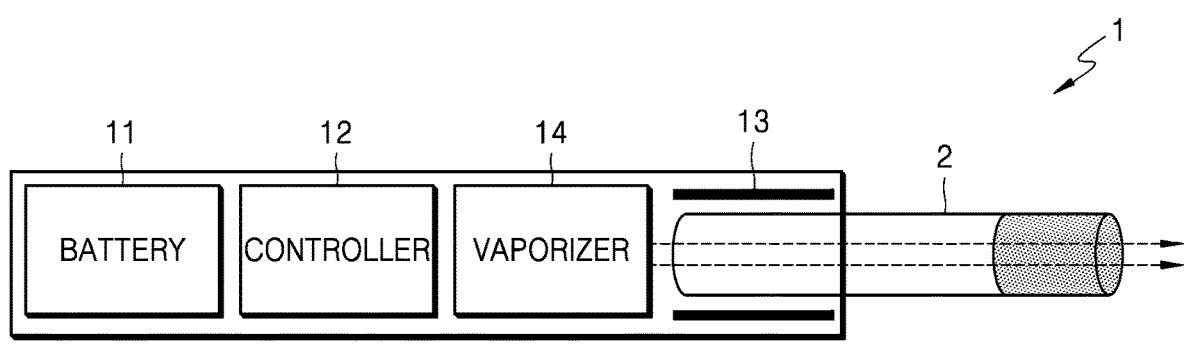
Figure 3:
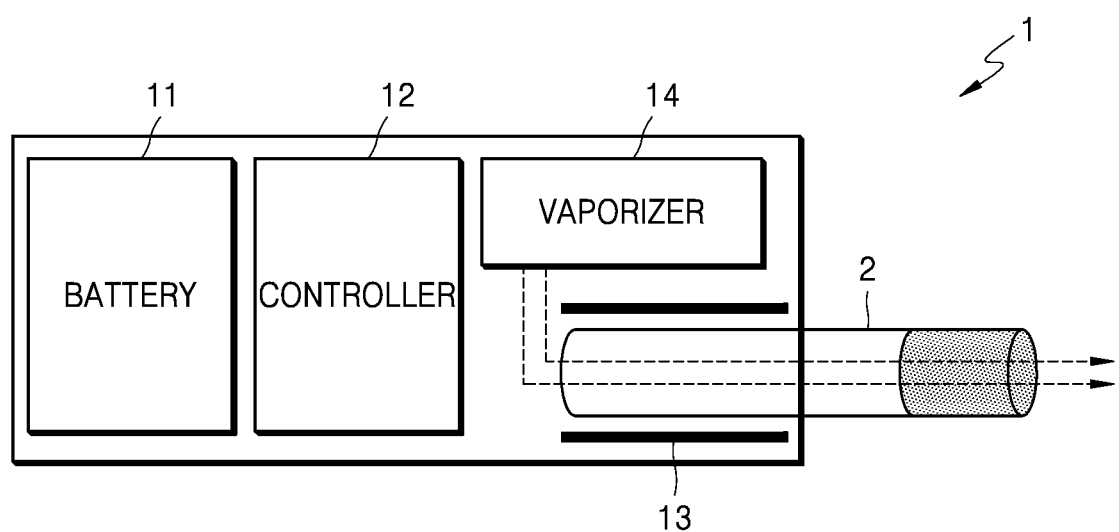

FIGS. 1 through 3 are diagrams showing examples in which a cigarette is inserted into an aerosol generating device.

Referring to FIG. 1, the aerosol generating device 1 may include a battery 11, a controller 12, and a heater 13. Referring to FIGS. 2 and 3, the aerosol generating device 1 may further include a vaporizer 14. Also, the cigarette 2 may be inserted into an inner space of the aerosol generating device 1.

FIGS. 1 through 3 illustrate components of the aerosol generating device 1, which are related to the present embodiment. Therefore, it will be understood by one of ordinary skill in the art related to the present embodiment that other general-purpose components may be further included in the aerosol generating device 1, in addition to the components illustrated in FIGS. 1 through 3.

FIG. 1 illustrates that the battery 11, the controller 12, and the heater 13 are arranged in series. Also, FIG. 2 illustrates that the battery 11, the controller 12, the vaporizer 14, and the heater 13 are arranged in series. Also, FIG. 3 illustrates that the vaporizer 14 and the heater 13 are arranged in parallel. However, the internal structure of the aerosol generating device 1 is not limited to the structures illustrated in FIGS. 1 through 3. In other words, according to the design of the aerosol generating device 1, the battery 11, the controller 12, the heater 13, and the vaporizer 14 may be differently arranged.

When the cigarette 2 is inserted into the aerosol generating device 1, the aerosol generating device 1 may operate the heater 13 and/or the vaporizer 14 to generate an aerosol. The aerosol generated by the heater 13 and/or the vaporizer 14 is delivered to a user by passing through the cigarette 2.

As necessary, even when the cigarette 2 is not inserted into the aerosol generating device 1, the aerosol generating device 1 may heat the heater 13.

The battery 11 may supply power to be used for the aerosol generating device 1 to operate. For example, the battery 11 may supply power to heat the heater 13 or the vaporizer 14, and may supply power for operating the controller 12. Also, the battery 11 may supply power for operations of a display, a sensor, a motor, etc. mounted in the aerosol generating device 1. The controller 12 may control overall operations of the aerosol generating device 1. In detail, the controller 12 may control not only operations of the battery 11, the heater 13, and the vaporizer 14, but also operations of other components included in the aerosol generating device 1. Also, the controller 12 may check a state of each of the components of the aerosol generating device 1 to determine whether or not the aerosol generating device 1 is able to operate.

The controller 12 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13 may be heated by the power supplied from the battery 11. For example, when the cigarette 2 is inserted into the aerosol generating device 1, the heater 13 may be located outside the cigarette 2. Thus, the heated heater 13 may increase a temperature of an aerosol generating material in the cigarette 2.

The heater 13 may include an electro-resistive heater. For example, the heater 13 may include an electrically conductive track, and the heater 13 may be heated when currents flow through the electrically conductive track. However, the heater 13 is not limited to the example described above and may include all heaters which may be heated to a desired temperature. Here, the desired temperature may be pre-set in the aerosol generating device 1 or may be set as a temperature desired by a user.

As another example, the heater 13 may include an induction heater. In detail, the heater 13 may include an electrically conductive coil for heating a cigarette in an induction heating method, and the cigarette may include a susceptor which may be heated by the induction heater.

For example, the heater 13 may include a tube-type heating element, a plate-type heating element, a needle-type heating element, or a rod-type heating element, and may heat the inside or the outside of the cigarette 2, according to the shape of the heating element.

Also, the aerosol generating device 1 may include a plurality of heaters 13. Here, the plurality of heaters 13 may be inserted into the cigarette 2 or may be arranged outside the cigarette 2. Also, some of the plurality of heaters 13 may be inserted into the cigarette 2 and the others may be arranged outside the cigarette 2. In addition, the shape of the heater 13 is not limited to the shapes illustrated in FIGS. 1 through 3 and may include various shapes.

The vaporizer 14 may generate an aerosol by heating a liquid composition and the generated aerosol may pass through the cigarette 2 to be delivered to a user. In other words, the aerosol generated via the vaporizer 14 may move along an air flow passage of the aerosol generating device 1 and the air flow passage may be configured such that the aerosol generated via the vaporizer 14 passes through the cigarette 2 to be delivered to the user.

For example, the vaporizer 14 may include a liquid storage, a liquid delivery element, and a heating element, but it is not limited thereto. For example, the liquid storage, the liquid delivery element, and the heating element may be included in the aerosol generating device 1 as independent modules.

The liquid storage may store a liquid composition. For example, the liquid composition may be a liquid including a tobacco-containing material having a volatile tobacco flavor component, or a liquid including a non-tobacco material. The liquid storage may be formed to be detachable from the vaporizer 14, or may be formed integrally with the vaporizer 14.

For example, the liquid composition may include water, a solvent, ethanol, plant extract, spices, flavorings, or a vitamin mixture. The spices may include menthol, peppermint, spearmint oil, and various fruit-flavored ingredients, but are not limited thereto. The flavorings may include ingredients capable of providing various flavors or tastes to a user. Vitamin mixtures may be a mixture of at least one of vitamin A, vitamin B, vitamin C, and vitamin E, but are not limited thereto. Also, the liquid composition may include an aerosol forming substance, such as glycerin and propylene glycol.

The liquid delivery element may deliver the liquid composition of the liquid storage to the heating element. For example, the liquid delivery element may be a wick such as cotton fiber, ceramic fiber, glass fiber, or porous ceramic, but is not limited thereto.

The heating element is an element for heating the liquid composition delivered by the liquid delivery element. For example, the heating element may be a metal heating wire, a metal hot plate, a ceramic heater, or the like, but is not limited thereto. In addition, the heating element may include a conductive filament such as nichrome wire and may be positioned as being wound around the liquid delivery element. The heating element may be heated by a current supply and may transfer heat to the liquid composition in contact with the heating element, thereby heating the liquid composition. As a result, aerosol may be generated.

For example, the vaporizer 14 may be referred to as a cartomizer or an atomizer, but it is not limited thereto.

The aerosol generating device 1 may further include general-purpose components in addition to the battery 11, the controller 12, the heater 13, and the vaporizer 14. For example, the aerosol generating device 1 may include a display capable of outputting visual information and/or a motor for outputting haptic information. Also, the aerosol generating device 1 may include at least one sensor. Also, the aerosol generating device 1 may be formed as a structure where, even when the cigarette 2 is inserted into the aerosol generating device 1, external air may be introduced or internal air may be discharged.

Although not illustrated in FIGS. 1 through 3, the aerosol generating device 1 and an additional cradle may form together a system. For example, the cradle may be used to charge the battery 11 of the aerosol generating device 1. Alternatively, the heater 13 may be heated when the cradle and the aerosol generating device 1 are coupled to each other.

The cigarette 2 may be similar as a general combustive cigarette. For example, the cigarette 2 may be divided into a first portion including an aerosol generating material and a second portion including a filter, etc. The second portion of the cigarette 2 may also include an aerosol generating material. For example, an aerosol generating material made in the form of granules or capsules may be inserted into the second portion.

The entire first portion may be inserted into the aerosol generating device 1, and the second portion may be exposed to the outside. Alternatively, only a portion of the first portion may be inserted into the aerosol generating device 1, or the entire first portion and a portion of the second portion may be inserted into the aerosol generating device 1. The user may puff aerosol while holding the second portion by the mouth of the user. In this case, the aerosol is generated by the external air passing through the first portion, and the generated aerosol passes through the second portion and is delivered to the user's mouth.

For example, the external air may flow into at least one air passage formed in the aerosol generating device 1. For example, opening and closing of the air passage and/or a size of the air passage may be adjusted by the user. Accordingly, the amount and quality of the aerosol may be adjusted by the user. As another example, the external air may flow into the cigarette 2 through at least one hole formed in a surface of the cigarette 2.

Figure 4:
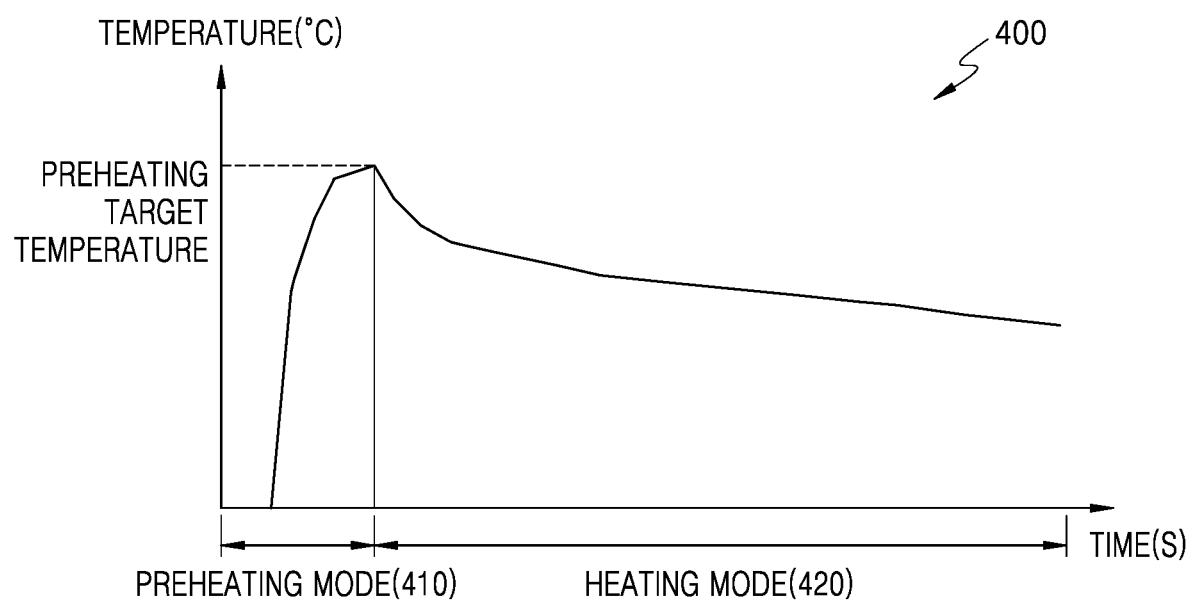
FIG. 4 is a schematic diagram showing temperature control characteristics of a common aerosol generating device. device.

FIG. 4 is a schematic diagram showing temperature control characteristics of a general aerosol generating device.

FIG. 4 illustrates a temperature profile 400 of a heater that heats an aerosol generating material within the aerosol generating device 1. Here, the temperature profile of a heater refers to a preset temperature profile to heat the heater. According to an embodiment of the present disclosure, the temperature profile 400 may be applied to the heater 13 that heats the cigarette 2 illustrated in FIGS. 1 to 3. However, the type of the heater 13 and the object that the heater 13 heats are not limited thereto.

The temperature profile 400 of the heater 13 may include a preheating mode 410 and a heating mode 420.

The preheating mode 410 may correspond to a time period during which electric power is supplied to the heater 13 for a temperature of the heater 13 to reach a preset preheating target temperature. The preset preheating target temperature may range from 200° C. to 350° C. A length of the time period corresponding to the preheating mode 410 may range from 20 seconds to 40 seconds.

The aerosol generating device 1 may receive a user input for operating the heater 13 in the preheating mode 410. For example, when the user presses a button provided within the aerosol generating device 1 to use the aerosol generating device 1, the heater 13 may enter the preheating mode 410 that rapidly raises the temperature of the heater 13 to the preheating target temperature.

When the heater 13 has entered the preheating mode 410, the controller 12 may control electric power supplied to the heater 13, based on a temperature profile of the preheating mode 410. For example, the controller 12 may supply electric power to the heater 13 for the temperature of the heater 13 to reach the preset preheating target temperature in the preheating mode 410. In order for the temperature of the heater 13 to reach the preset preheating target temperature within a short period of time, the controller 12 may set a frequency and a duty cycle of the pulse of current that the battery 11 supplies to the heater 13 through pulse width modulation to their maximum values, respectively.

The pulse width modulation is a modulation technique that controls an analogue circuit with a digital output of a processor. When a duration (i.e., pulse width) refers to a period of time during which a signal is on in a period T, and a duty refers to a ratio of on and off times, a duty value is determined by duration (pulse width)*100/T (period). As the duty value increases, the ratio of the on-time in the entire period T increases, and the average power delivered to the load also increases. Therefore, the controller 12 may regulate electric power supplied to the heater 13 in the preheating mode 410 by adjusting the duty value of a pulse width modulator.

However, the method of the controller 12 for regulating electric power supplied to the heater 13 is not limited thereto, and the temperature of the heater 13 may be controlled in various ways such as ON/OFF control, proportional control, integral control, differential control, PID control, and the like.

When the temperature of the heater 13 reaches the preheating target temperature, the aerosol generating device 1 may end the preheating mode 410. However, the criteria for starting and ending a preheating mode 410 are not limited thereto. When the preheating mode 410 is terminated, the aerosol generating device 1 may notify the user that the preheating has ended, through a display or lamp that outputs visual information, a motor that outputs tactile information, a speaker that outputs sound information, or the like.

When the preheating mode 410 is terminated, the aerosol generating device 1 may cause the heater 13 to enter the heating mode 420. The heating mode 420 may refer to a time period that starts after the preheating mode 410 is terminated due to the heater 13 being heated to the preheating target temperature or higher.

The controller 12 may control electric power supplied to the heater 13, based on a temperature profile of the heating mode 420. For example, the controller 12 may control electric power supplied to the heater 13 for the temperature of the heater 13 to be maintained lower than the preheating target temperature.

A length of the time period corresponding to the heating mode 420 may be in the range of 3 minutes to 5 minutes. When a preset period of time elapses after the heating mode 420 has started, the aerosol generating device 1 may cut off electric power supplied to the heater 13. On the other hand, even before the preset period of time elapses after the heating mode 420 has started, if a frequency of puffs of the user counted by the aerosol generating device 1 reaches a preset number, the aerosol generating device 1 may cut off electric power supplied to the heater 13.

Depending on the length of the time period corresponding to the preheating mode 410, in other words, depending on the preheating time, the temperature of each cigarette being heated may be different. This may be problematic because the taste of the cigarette is not constant during smoking. Therefore, the controller 12 may monitor an output voltage of the battery 11 and a change in the temperature of the heater 13 to control the preheating time of the cigarette being heated to be constant.

Still, the aerosol generating device 1 may consume a large amount of current for the temperature of the heater 13 to reach the preset preheating target temperature within a short period of time in the preheating mode 410 as described above. Accordingly, the output voltage of the battery 11 may drop rapidly.

When the output voltage of the battery 11 drops rapidly, it is difficult for the controller 12 to monitor a change in the temperature of the heater 13 in real time, and accordingly, the controller 12 may not be able to regulate the preheating time of each cigarette being heated to be constant. In addition, when the output voltage of the battery 11 drops to a cut-off voltage or lower, the user may not complete smoking.

Hereinafter, a configuration of the aerosol generating device 1 for resolving such voltage drop phenomenon of the battery 11 will be described.

Figure 5:
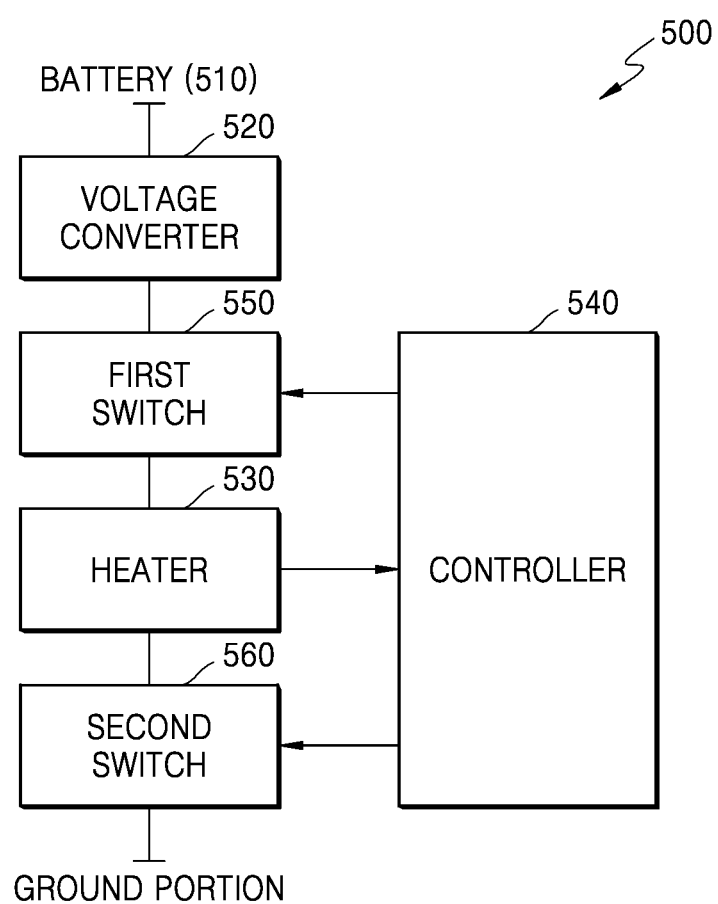
FIG. 5 is a diagram showing an example of a configuration of an aerosol generating device.

FIG. 5 is a diagram illustrating an example of a configuration of an aerosol generating device.

Referring to FIG. 5, an aerosol generating device 500 may include a battery 510, a voltage converter 520, a heater 530, a controller 540, a first switch 550, and a second switch 560. FIG. 5 only shows certain components the aerosol generating device 500 which are particularly related to the present embodiment. However, those skilled in the art will understand that the aerosol generating device 500 may further include other general-purpose components in addition to the components illustrated in FIG. 5.

The battery 510 supplies electric power used for the aerosol generating device 500 to operate. The battery 510 may supply electric power for the heater 530 to be heated. The battery 510 may also supply electric power needed for other hardware, the controller 540, a sensor, and an interface installed in the aerosol generating device 500 to operate.

The battery 510 may include a lithium iron phosphate (LiFePO$_4$) battery. However, embodiments of the present disclosure are not limited thereto. The battery 510 may be made of a lithium cobalt oxide (LiCoO$_2$) battery, a lithium titanate battery, or the like. The battery 510 may include a rechargeable battery or a disposable battery.

The battery 510 may be discharged by supplying electric power used for each component of the aerosol generating device 500 including the heater 530 to operate. As the battery 510 is discharged, a voltage output from the battery may drop. If the battery 510 is over-discharged, the battery 510 may not be used any longer. Therefore, a cut-off voltage may be set within the aerosol generating device 500. The cut-off voltage indicates a voltage value for determining that a battery is completely discharged, and is designed to prevent over-discharge. When the cut-off voltage is set high, the battery 510 may be considered completely discharged at an early time, and thus available capacity of the battery 510 may be reduced. On the other hand, when the cut-off voltage is set low, there may be a risk of the battery 510 being over-discharged. Therefore, it is necessary to set an appropriate cut-off voltage.

For example, when the battery 510 is a lithium-ion battery, the battery 510 may be discharged rapidly from a point where the voltage of the battery 510 is discharged to about 3.3 V to about 3.4 V. As a result, the battery 510 may be in an over-discharge state. Therefore, the cut-off voltage of about 3.5 V may be set within the aerosol generating device 1 to prevent over-discharge.

The voltage converter 520 may be electrically connected to the battery 510 in series. For example, the voltage converter 520 may be arranged between the battery 510 and the first switch 550 to be electrically connected to the battery 510 in series.

The voltage converter 520 may convert the voltage applied from the battery 510 to a constant voltage to output a preset fixed voltage. The voltage applied from the battery 510 is identical with an output voltage of the battery 510. The preset fixed voltage may be decided in consideration of temperature rise efficiency of the heater 530, uniformity of generated atomization, quality of tobacco taste, and the like.

When the heater 13 operates in a preheating mode, the preset fixed voltage may be set to rectify a voltage drop phenomenon in which the output voltage of the battery 510 drops rapidly. For example, when the output voltage of the battery 510 is a low voltage, a large amount of current consumed for a temperature of the heater 530 to reach a preset preheating target temperature may cause the output voltage of the battery 510 to drop rapidly. In order to prevent such rapid voltage drop, the output voltage of the battery 510 may be raised to a preset fixed voltage through the voltage converter 520 and be applied to the heater 530. In this case, a relatively smaller amount of current may be consumed than when the output voltage of the battery 510 is applied to the heater 530 without converting the output voltage of the battery 510 into the preset fixed voltage. Therefore, a degree to which the output voltage of the battery 510 drops rapidly in the preheating mode may be reduced.

For example, the preset fixed voltage may range from 3.6 V to 4 V, and it is desirable that the preset fixed voltage be 3.8 V.

The voltage converter 520 may include any one of a buck boost converter, an operating amplifier (OP Amp), and a low dropout (LDO) voltage regulator.

When the voltage applied from the battery 510 is lower than the preset fixed voltage, the voltage converter 520 may raise the applied voltage. Also, when the voltage applied from the battery 510 is higher than the preset fixed voltage, the voltage converter 520 may lower the applied voltage.

As described above, by arranging the voltage converter 520 between the battery 510 and the heater 530, the output voltage of the battery 510 may not be applied to the heater 530 directly. Instead, the preset fixed voltage output from the voltage converter 520 may be applied to the heater 530.

Therefore, since the preset fixed voltage is able to be applied to the heater 530 constantly, the preheating time may be maintained the same for each cigarette being heated. In addition, when the output voltage of the battery 510 is a low voltage, as the output voltage of the battery 510 is raised to the preset fixed voltage through the voltage converter 520 before being applied to the heater 530, a relatively smaller amount of current may be consumed than when the output voltage of the battery 510 is applied to the heater 530 without converting the output voltage of the battery 510 into the preset fixed voltage. Therefore, since a degree to which the output voltage of the battery 510 drops rapidly in the preheating mode may be reduced, power efficiency of the battery 510 may be enhanced.

The heater 530 is electrically heated by electric power supplied by the battery 510 under the control of the controller 540. The heater 530 is located inside an accommodation passage of the aerosol generating device 500 that accommodates a cigarette. As the cigarette is inserted into the aerosol generating device 500 from outside through an insertion hole and then is moved through the accommodation passage, one end portion of the cigarette may be inserted into the heater 530. Thus, the heated heater 530 may raise a temperature of an aerosol generating material inside the cigarette. The heater 530 may include any type of heater as long as it may be inserted into the cigarette.

The heater 530 may include a heat source and a heat transfer object. For example, the heat source of the heater 530 may be manufactured in the form of a film including an electrical resistivity pattern, and the film-shaped heater 530 may be arranged to surround at least a portion of an outer surface of the heat transfer object (e.g., a heat transfer tube).

The heat transfer tube may include a metal material capable of transferring heat such as aluminum or stainless steel, an alloy material, carbon, a ceramic material, or the like. When electric power is supplied to the electrical resistivity pattern of the heater 530, heat is generated, and the generated heat may heat the aerosol generating material through the heat transfer tube.

The aerosol generating device 500 may be provided with a separate temperature detection sensor. Without a separate temperature detection sensor, the heater 530 may play a role of a temperature detection sensor. Alternatively, the heater 530 plays a role of a temperature detection sensor, and at the same time, the aerosol generating device 500 may be further provided with a separate temperature detection sensor. The temperature detection sensor may be arranged on the heater 530 in the form of a conductive track or a device.

If voltage applied to the temperature detection sensor and current flowing through the temperature detection sensor are measured, resistance R may be determined. In that case, the temperature detection sensor may measure temperature T through Equation 1 below.

$$R = R_0\{1 + \alpha(T - T_0)\} \quad \text{[Equation 1]}$$

In Equation 1, R refers to a current resistance value of the temperature detection sensor, R0 refers to a resistance value at temperature T0 (for example, 0° C.), and a refers to a resistance temperature coefficient of the temperature detection sensor. Since a conductive material (for example, metal) has a unique resistance temperature coefficient, a may be predetermined according to the conductive material constituting the temperature detection sensor. Therefore, if the resistance R of the temperature detection sensor is determined, the temperature T of the temperature detection sensor may be calculated through Equation 1 above.

The controller 540 may control operation of the components included in the aerosol generating device 500. The controller 540 is an integrated circuit implemented with a processing unit such as a microprocessor, microcontroller, and the like.

The controller 540 may control an amount of electric power supplied to the heater 530 and a period of time for which electric power is supplied to the heater 530 so that a result sensed by the temperature detection sensor is analyzed, and accordingly, the heater 530 is heated to a certain temperature or maintains an appropriate temperature.

As the voltage converter 520 is arranged between the battery 510 and the heater 530, the controller 540 may control electric power supplied to the heater 530 by the voltage converter 520. When the heater 530 operates in the preheating mode, the controller 540 may control electric power supplied to the heater 530 for the temperature of the heater 530 to reach the preset preheating target temperature. Also, when the heater 530 operates in a heating mode, the controller 540 may control electric power supplied to the heater 530 for the temperature of the heater 530 to be maintained within a range of temperature lower than the preset preheating target temperature.

For example, the controller 540 may determine whether the heater 530 operates in the preheating mode, and when the heater 530 operates in the preheating mode, the controller 540 may control electric power supplied to the heater 530 such that a preset fixed voltage output from the voltage converter 520 may be applied to the heater 530.

The controller 540 may also determine the period of time for which the heater 530 is preheated in the preheating mode, based on the amount of electric power required for the temperature of the heater 530 to reach the preset preheating target temperature and the preset fixed voltage that is output from the voltage converter 520 to the heater 530.

In order to maintain a uniform tobacco taste, an amount of heat supplied to the aerosol generating material of each cigarette being heated needs to be constant. To this end, the amount of electric power supplied to the heater 530 may be constant in the preheating mode. The amount of electric power supplied to the heater 530 may be determined by the voltage applied to the heater 530 and a period of time for which the voltage is applied to the heater 530. Here, since the voltage applied to the heater 530 is constant as the preset fixed voltage, regardless of the output voltage of the battery 510, the period of time for which the heater 530 is preheated to supply electric power required to the heater 530 in the preheating mode may be relatively constant.

The first switch 550 may be arranged between the voltage converter 520 and the heater 530. The first switch 550 may switch between an open state and a closed state depending on a signal input from outside. As the first switch 550 switches to the open state, the heater 530 may be cut off from electric power by the battery 510. On the other hand, as the first switch 550 switches to the closed state, the heater 530 may be supplied with electric power by the battery 510.

The controller 540 may output a control signal that controls the open and closed states of the first switch 550. The controller 540 may output the control signal that controls the first switch 550 to be closed for a period of time for which the heater 530 needs to be heated, and controls the first switch 550 to be opened for the remaining periods of time. Therefore, since the first switch 550 is closed for the period of time for which the heater 530 needs to be heated, the preset fixed voltage output from the voltage converter 520 may be applied to the heater 530.

The first switch 550 may include a field-effect transistor (FET). Alternatively, the first switch 550 may include a different electric device other than the FET, which is capable of switching between the open state and the closed state depending on the signal input from outside. For example, the first switch 550 may include a bipolar junction transistor (BJT), an insulated gate bipolar transistor (IGBT), or a thyristor. However, embodiments of the present disclosure are not limited thereto.

The second switch 560 may be arranged between the heater 530 and ground. The second switch 560 may switch between the open state and the closed state depending on the signal input from outside. The second switch 560 may repeatedly switch between the open state and the closed state for a short period of time. The second switch 560 may repeatedly switch between the open state and the closed state based on the duty cycle of power required by the heater 530.

For example, the controller 540 may output a control signal that controls the open and closed states of the second switch 560. The controller 540 may output the control signal that causes the second switch 560 to repeatedly switch between the open state and the closed state such that the heater 530 may generate heat according to a temperature profile. Therefore, the controller 540 may regulate a time at which the preset fixed voltage output from the voltage converter 520 is applied to the heater 530, through the control signal that controls the open and closed states of the second switch 560.

The second switch 560 may include a FET like the first switch 550. Alternatively, the second switch 560 may include a different electric device other than the FET, which is capable of switching between the open state and the closed state depending on the signal input from outside. For example, the second switch 560 may include a BJT, an IGBT, or a thyristor. However, embodiments of the present disclosure are not limited thereto.

FIG. 6 is a diagram illustrating an example of a preheating time when a voltage converter is located between a battery and a heater.

FIG. 6 is a diagram illustrating preheating time when the voltage converter 520 is not located between the battery 510 and the heater 530 and when the voltage converter 520 is located between the battery 510 and the heater 530, respectively. The preheating time may indicate an amount of time that is taken for a temperature of the heater 530 to reach a preset preheating target temperature when the heater 530 operates in a preheating mode.

Table of FIG. 6 illustrates the preheating time according to an output voltage of the battery 510 at the moment when a user presses a button provided on the aerosol generating device 500 to use the aerosol generating device 500. The table shows part of the results of measuring the preheating time according to the output voltage of the battery 510. The preheating time has been measured with and without the voltage converter 520, under the condition that other configurations of the aerosol generating device 500 and a cigarette inserted into the aerosol generating device 500 are exactly the same.

Referring to the table of FIG. 6, it may be seen that when the voltage converter 520 is not located between the battery 510 and the heater 530, the preheating time varies according to the output voltage of the battery 510. For example, when the output voltage of the battery 510 is 4.21 V, it takes 20.0 seconds for the temperature of the heater 530 to reach the preset preheating target temperature. On the other hand, when the output voltage of the battery 510 is 3.61 V, it takes 24.1 seconds for the temperature of the heater 530 to reach the preset preheating target temperature. Therefore, depending on the output voltage of the battery 510, the preheating time may vary by up to 4.1 seconds. If the preheating time varies, a degree to which the cigarette inserted into the aerosol generating device 500 is preheated may vary. As a result, the taste of a cigarette may not be consistent.

On the other hand, when the voltage converter 520 is located between the battery 510 and the heater 530, even if the output voltage of the battery 510 changes in the range of 3.61 V to 4.21 V, the preheating time is constant within a range of 21 seconds to 22 seconds. That is because even when the output voltage of the battery 510 varies, the voltage converter 520 located between the battery 510 and the heater 520 converts the output voltage of the battery 510 into a preset fixed voltage, and thus, a constant voltage is supplied to the heater 530. As the preheating time is constant, the degree to which the cigarette inserted into the aerosol generating device 500 is preheated is constant. Therefore, the taste of a cigarette may be consistent.

Figure 7:
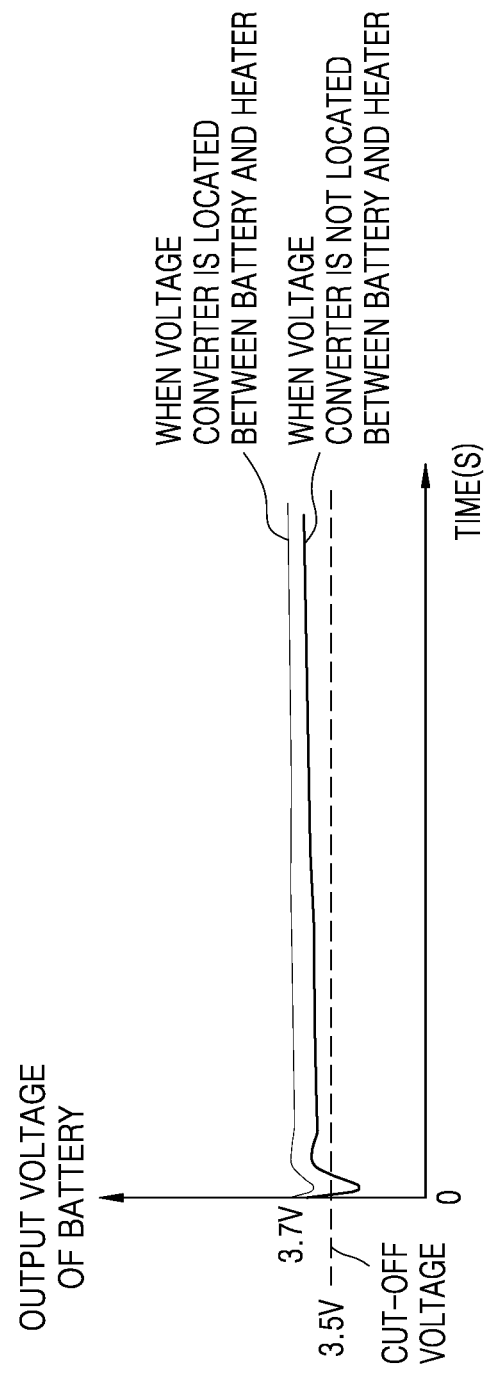
FIG. 7 is a diagram illustrating an example of an output voltage of a battery over time when a voltage converter is located between a battery and a heater.

FIG. 7 is a diagram illustrating a change of an output voltage of a battery over time when a voltage converter is located between the battery and a heater.

FIG. 7 is a graph illustrating an output voltage of the battery 510 from the moment when a user presses a button provided on the aerosol generating device 500 to use the aerosol generating device 500 to the moment when a preheating mode ends. The output voltage of the battery 510 that varies over time has been measured with and without the voltage converter 520, under the condition that other configurations of the aerosol generating device 500, a cigarette inserted into the aerosol generating device 500, and the output voltage of the battery 510 at the moment when the user presses a button provided on the aerosol generating device 500 to use the aerosol generating device 500 are exactly the same. For example, the output voltage of the battery 510 at the moment when the user presses a button provided on the aerosol generating device 500 to use the aerosol generating device 500 may be 3.7 V as illustrated in FIG. 7. However, embodiments are not limited thereto, and the output voltage may have a different value.

The aerosol generating device 500 may consume a large amount of current for a temperature of the heater 530 to reach a preset preheating target temperature within a short period of time in the preheating mode. Accordingly, the output voltage of the battery 510 may drop rapidly.

Referring to the graph of FIG. 7, it may be seen that the output voltage of the battery 510 drops more rapidly when the voltage converter 520 is not located between the battery 510 and the heater 530 than when the voltage converter 520 is located between the battery 510 and the heater 530. That is because, since the output voltage of the battery 510 is raised to a preset fixed voltage through the voltage converter 520 to be applied to the heater 530, a relatively smaller amount of current may be consumed when the voltage converter 520 is located between the battery 510 and the heater 530 than when the voltage converter 520 is not located between the battery 510 and the heater 530.

In addition, when the voltage converter 520 is not located between the battery 510 and the heater 530, the output voltage of the battery 510 drops to a preset cut-off voltage or lower. In this case, a user may not be able to complete smoking. The cut-off voltage may be 3.5 V as illustrated in FIG. 7. However, embodiments are not limited thereto, and the cut-off voltage may be set differently.

On the contrary, when the voltage converter 520 is located between the battery 510 and the heater 530, a voltage drop of the output voltage of the battery 510 may be reduced. Thus the output voltage of the battery 510 may not drop to the preset cut-off voltage or lower. Accordingly, power efficiency of the battery 510 may be increased, and thus more cigarettes may be heated than when the voltage converter 520 is not located between the battery 510 and the heater 530.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating device comprising:
    a battery;
    a heater configured to heat an aerosol generating material;
    a voltage converter configured to output a preset fixed voltage by converting a voltage applied from the battery to a constant voltage; and
    a controller configured to determine whether the heater is operating in a preheating mode, and control electric power supplied from the voltage converter to the heater such that the preset fixed voltage is applied to the heater in the preheating mode to reach a preset preheating target temperature,
    wherein a period of time for preheating the heater in the preheating mode is determined to be constant based on an amount of power required for the temperature of the heater to reach the preset preheating target temperature and the preset fixed voltage being applied to the heater in the preheating mode.

2. The aerosol generating device of claim 1, wherein the voltage converter is further configured to:
    raise the voltage applied from the battery based on the voltage being lower than the preset fixed voltage, and
    lower the voltage applied from the battery based on the voltage being higher than the preset fixed voltage.

3. The aerosol generating device of claim 1, wherein the heater is further configured to operate in a heating mode, and the controller is further configured to:
    control the electric power supplied to the heater such that the temperature of the heater is maintained below the preset preheating target temperature in the heating mode.

4. The aerosol generating device of claim 1, wherein, the voltage converter corresponds to any one of a buck boost converter, an operating amplifier (OP Amp), and a low dropout (LDO) voltage regulator.

5. The aerosol generating device of claim 1, further comprising:
    a first switch located between the voltage converter and the heater, and configured to switch between an open state and a closed state according to an input control signal; and
    a second switch located between the heater and ground, and configured to switch between an open state and a closed state according to an input control signal.

6. The aerosol generating device of claim 5, wherein the controller is further configured to:
    output a control signal that closes the first switch during a heating period of the heater, and
    output a control signal that repeatedly opens and closes the second switch according to a power duty cycle of the heater during the heating period of the heater.

7. The aerosol generating device of claim 5, wherein the first switch and the second switch include a field-effect transistor.

* * * * *